United States Patent
Hishida et al.

(10) Patent No.: US 10,650,173 B2
(45) Date of Patent: May 12, 2020

(54) SUPPORT APPARATUS, DESIGN SUPPORT METHOD, AND PROGRAM

(71) Applicants: IHI CORPORATION, Koto-ku (JP); THE UNIVERSITY OF TOKYO, Bunkyo-ku (JP)

(72) Inventors: Hiroyuki Hishida, Koto-ku (JP); Koichi Inagaki, Koto-ku (JP); Takeshi Nakamura, Koto-ku (JP); Fumiaki Watanabe, Koto-ku (JP); Kotaro Morioka, Bunkyo-ku (JP); Yutaka Ohtake, Bunkyo-ku (JP); Hiromasa Suzuki, Bunkyo-ku (JP); Yukie Nagai, Bunkyo-ku (JP)

(73) Assignees: IHI CORPORATION, Koto-ku (JP); THE UNIVERSITY OF TOKYO, Bunkyo-ku (JP)

( * ) Notice: Subject to any disclaimer, the term of this patent is extended or adjusted under 35 U.S.C. 154(b) by 9 days.

(21) Appl. No.: 15/511,400

(22) PCT Filed: Sep. 16, 2015

(86) PCT No.: PCT/JP2015/076350
§ 371 (c)(1),
(2) Date: Mar. 15, 2017

(87) PCT Pub. No.: WO2016/043237
PCT Pub. Date: Mar. 24, 2016

(65) Prior Publication Data
US 2017/0308631 A1  Oct. 26, 2017

(30) Foreign Application Priority Data
Sep. 16, 2014 (JP) ................... 2014-188164

(51) Int. Cl.
*G06F 30/20* (2020.01)
*G06F 30/23* (2020.01)
(Continued)

(52) U.S. Cl.
CPC ............. *G06F 30/20* (2020.01); *G06F 30/17* (2020.01); *G06F 30/23* (2020.01); *G06N 5/04* (2013.01); *G06F 2113/26* (2020.01)

(58) Field of Classification Search
CPC ............. G06F 17/5009; G06F 17/5018; G06F 17/5086; G06F 2217/44; G06N 5/04
(Continued)

(56) References Cited

U.S. PATENT DOCUMENTS

| 8,170,842 B2* | 5/2012 | Ognjanovic | ........ G06F 17/5018 156/229 |
| 9,011,616 B2* | 4/2015 | Hunter | .................... B29C 70/00 156/64 |

(Continued)

FOREIGN PATENT DOCUMENTS

| JP | 2004-292976 A | 10/2004 |
| JP | 2005-186900 A | 7/2005 |

OTHER PUBLICATIONS

Garimella et al, "Boundary Layer Meshing for Viscous Flows in Complex Domains", 2000, ResearchGate, "Garinnella " (Year: 2000).*

(Continued)

*Primary Examiner* — Kamini S Shah
*Assistant Examiner* — Faraj Ayoub
(74) *Attorney, Agent, or Firm* — Oblon, McClelland, Maier & Neustadt, L.L.P.

(57) ABSTRACT

A design support apparatus supporting designing of a product which uses a fiber material includes a processor that creates a predicted shape model by predicting a shape of the (Continued)

product before a deformation processing. The processor: creates a 3-dimensional shape model of the product; creates curved shape models by separating the 3-dimensional shape model into two or more fiber layers; sets a correspondence relationship between the curved shape models; creates an orientation vector field in the curved shape models; and predicts the shape of the product before the deformation processing by developing the curved shape models on a flat surface based on the correspondence relationship between the curved shape models and the orientation vector field in the curved shape models, and creates the predicted shape model based on the predicted shape.

6 Claims, 7 Drawing Sheets

(51) Int. Cl.
    *G06F 113/26*     (2020.01)
    *G06F 30/17*     (2020.01)
    *G06N 5/04*     (2006.01)

(58) Field of Classification Search
    USPC .............................................................. 703/6
    See application file for complete search history.

(56) References Cited

U.S. PATENT DOCUMENTS

| | | | |
|---|---|---|---|
| 2008/0208540 A1* | 8/2008 | Burgos Gallego | G06F 17/50 703/1 |
| 2010/0236695 A1* | 9/2010 | Lamontia | B29D 30/52 156/123 |
| 2013/0218540 A1* | 8/2013 | Fertig | G06F 30/23 703/2 |

OTHER PUBLICATIONS

Aono et al, "Modeling methods for the design of 3D broadcloth composite parts", 2001, Elsevier (Year: 2001).*
International Search Report dated Nov. 10, 2015 in PCT/JP2015/076350 filed Sep. 16, 2015.
Extended European Search Report dated Apr. 18, 2018 in Patent Application No. 15841950.7.
Laxmi Parida, et al., "Constraint-satisfying Planar Development of Complex Surfaces", Computer-Aided Design, vol. 25, No. 4, XP000373117, Apr. 1993, pp. 225-232.
M. Aono, et al., "Modeling methods for the design of 3D broadcloth composite parts", Computer-Aided Design, vol. 33, No. 13, XP004308160, Nov. 2001, pp. 989-1007.
B.G. Prakash, et al., "AUTOLAY—a GUI-based design and development software for laminated composite components", Computers & Graphics, vol. 23, No. 1, XP004161352, Feb. 1999, pp. 95-110.

* cited by examiner

SUPPORT APPARATUS, DESIGN SUPPORT METHOD, AND PROGRAM

TECHNICAL FIELD

Embodiments described herein relate to a design support apparatus, a design support method, and a program and is particularly suited for use in a design support apparatus, design support method, and program for supporting designing of a thick fiber material.

BACKGROUND ART

In recent years, development of a fiber-reinforced composite material has been being promoted. The fiber-reinforced composite material is a composite material manufactured by combining fibers with a support material and has excellent material properties, that is, light weight and high strength as compared to single materials. Examples of the fiber-reinforced composite material include CMC (Ceramic Matrix Composites) and FRP (Fiber Reinforced Plastics). These CMC and FRP are used for aircraft elements and can enhance the strength and fuel efficiency.

Regarding the procedure for manufacturing a product using the fiber-reinforced composite material, a 3-dimensional shape model of the product, which is a final product, is firstly created by using design support tools such as 3-dimensional CAD (Computer Aided Design) software. Next, a fiber material is manufactured by predicting a material shape before deformation processing on the basis of the created 3-dimensional shape model; and then the deformation processing of the fiber material is actually performed, thereby manufacturing the product.

Meanwhile, products using the fiber-reinforced composite material has the drawback of high manufacturing cost. Therefore, both design technology and manufacturing technology are improved in order to further promote the widespread use of the products which use the fiber-reinforced composite material. No reference will be herein made to the manufacturing technology, but the design technology will be explained. Particularly, an explanation will be given about the design technology for a product using a thick fiber-reinforced composite material configured by placing many fiber layers, which are formed by interlacing warp yarns with weft yarns, on top of each other.

PTL 1 discloses a technology that easily and accurately predicts a surface shape of woven fabric after being woven based on an organizational chart of the woven fabric by using woven fabric CAD. Specifically speaking, PTL 1 discloses the technology used when weaving the woven fabric, to predict a force received by organizational points where the warp yarns intersect with the weft yarns, and directions and distance of movements of the organizational points by the received force, move the organizational points in the predicted directions by the predicted distance, and thereby display the surface structure of the completed woven fabric on a screen.

CITATION LIST

Patent Literature

PTL 1: Japanese Patent Application Laid-Open (Kokai) Publication No. 2004-292976

SUMMARY

Problems to be Solved

However, the technology described in PTL 1: only predicts the shape of the woven fabric which is a flat surface even after it is woven on the basis of the planar organizational chart; and cannot predict changes in the shape of the thick woven fabric configured by placing many fiber layers on top of each other. Moreover, the technology described in PTL 1 predicts the shape after weaving (the shape of the product which is a final product) on the basis of the organizational chart before weaving (the material shape before the deformation processing), so that the technology described in PTL 1 cannot predict the material shape from the shape of the product.

Specifically speaking, the technology described in PTL 1 cannot predict the material shape before the deformation processing from a 3-dimensional shape model of the product which uses the fiber-reinforced composite material. Particularly, since the product which uses the fiber-reinforced composite material is configured by placing many fiber layers on top of each other as mentioned above, it has a thick, complicated shape and has anisotropy, which indicates that the strength depends on fiber directions; and, in that regard, the product which uses the fiber-reinforced composite material is significantly different from normal woven fabric.

So, it is generally difficult to predict the material shape before the deformation processing and the fiber directions before the deformation processing from the product which uses the fiber-reinforced composite material. Under the present circumstances, one has no choice but to depend on experts' skills and know-how in order to predict the material shape before the deformation processing from the 3-dimensional shape model of the product; and in this case, there is a problem of discrepancies in the shape and the strength between the actual product and the 3-dimensional shape model.

The present disclosure was devised in consideration of the above-described circumstances and proposes a design support apparatus, design support method, and program capable of predicting, with good accuracy, the material shape before the deformation processing from the 3-dimensional shape model of the product which uses the fiber-reinforced composite material.

Means to Solve the Problems

In order to solve the above-described problem, provided according to the present disclosure is a design support apparatus for supporting designing of a product which uses a fiber material, wherein the design support apparatus includes a processor that creates a predicted shape model by predicting a shape of the product before deformation processing, and wherein the processor: creates a 3-dimensional shape model of the product; creates curved shape models by separating the 3-dimensional shape model into two or more fiber layers; sets a correspondence relationship between the curved shape models; creates an orientation vector field in the curved shape models; and predicts the shape of the product before the deformation processing by developing the curved shape models on a flat surface on the basis of the correspondence relationship between the curved shape models and the orientation vector field in the curved shape models, and creates the predicted shape model on the basis of the predicted shape.

Furthermore, in order to solve the above-described problem, provided according to the present disclosure is a design support method for supporting designing of a product which uses a fiber material, wherein the design support method includes the following steps executed by a processor that creates a predicted shape model by predicting a shape of the product before deformation processing: a first step of creating a 3-dimensional shape model of the product; a second step of creating curved shape models by separating the 3-dimensional shape model into two or more fiber layers; a third step of setting a correspondence relationship between the curved shape models; a fourth step of creating an orientation vector field in the curved shape models; and a fifth step of predicting the shape of the product before the deformation processing by developing the curved shape models on a flat surface on the basis of the correspondence relationship between the curved shape models and the orientation vector field in the curved shape models, and creating the predicted shape model on the basis of the predicted shape.

Furthermore, in order to solve the above-described problem, provided according to the present disclosure is a program for supporting designing of a product which uses a fiber material, wherein the program causes a computer to execute: a first step of creating a 3-dimensional shape model of the product; a second step of creating curved shape models by separating the 3-dimensional shape model into two or more fiber layers; a third step of setting a correspondence relationship between the curved shape models; a fourth step of creating an orientation vector field in the curved shape models; and a fifth step of predicting the shape of the product before the deformation processing by developing the curved shape models on a flat surface on the basis of the correspondence relationship between the curved shape models and the orientation vector field in the curved shape models, and creating the predicted shape model on the basis of the predicted shape.

Effects

According to the present disclosure, the material shape before the deformation processing can be predicted with good accuracy from the 3-dimensional shape model of the product which uses the fiber-reinforced composite material.

DESCRIPTION OF EMBODIMENTS

An embodiment of the present disclosure will be explained below in detail with respect to diagrams.

(1) Configuration of Design Support Apparatus

Figure 1:
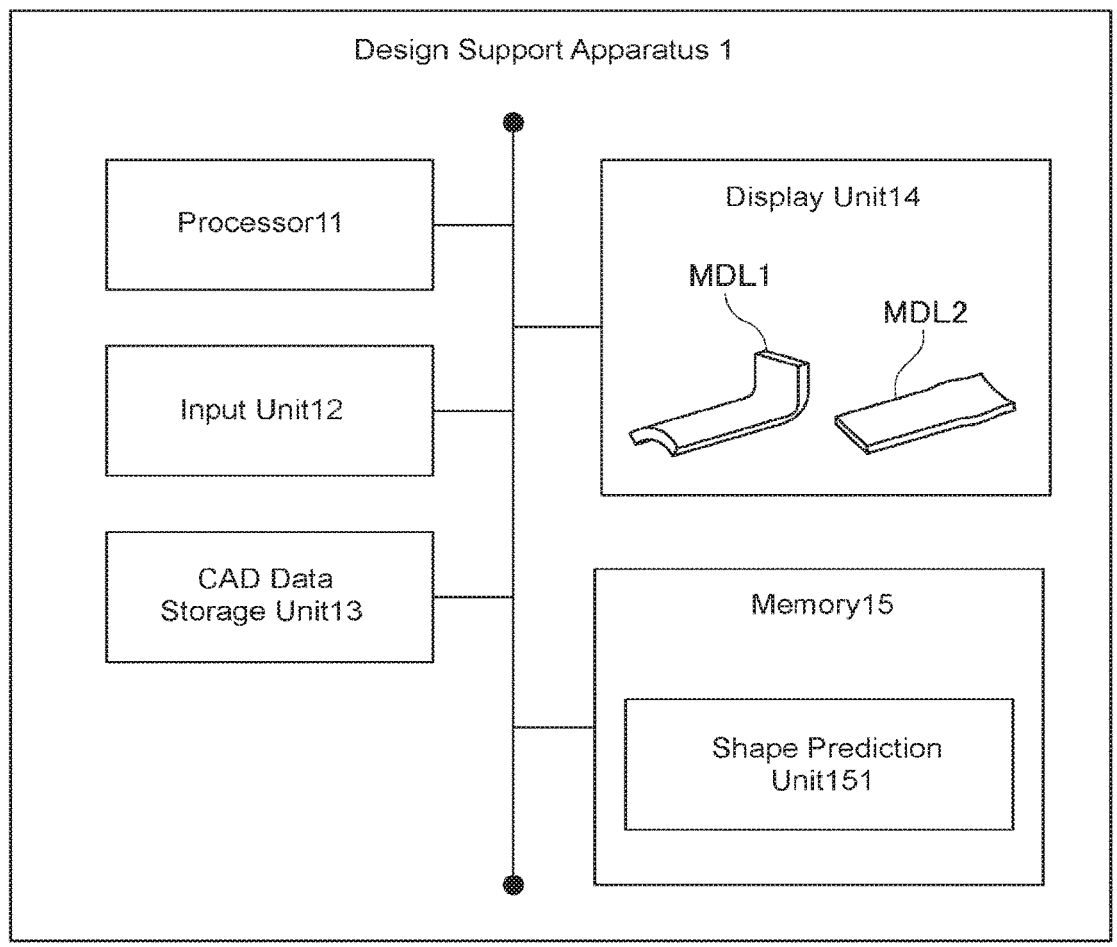
FIG. 1 is an overall configuration diagram of a design support apparatus.

FIG. 1 illustrates an overall configuration of a design support apparatus 1 according to this embodiment. The design support apparatus 1 is a computer configured by including a processor 11, an input unit 12, a CAD (Computer Aided Design) data storage unit 13, a display unit 14, and a memory 15. The processor 11 includes a CPU (Central Processing Unit), a RAM (Random Access Memory), and so on and controls the operation of the design support apparatus 1 in a supervising manner in cooperation with various programs stored in the CAD data storage unit 13 or the memory 15.

The input unit 12 is an interface for accepting inputs from a user and is, for example, a keyboard and a mouse. The CAD data storage unit 13 is a storage medium that stores a design support tool containing CAD-related application programs and data and stores CAD data created by using this design support tool.

The display unit 14 is a display device such as an LCD (Liquid Crystal Display) that displays a shape model based on CAD data. For example, the display unit 14 displays a 3-dimensional shape model MDL1 of a product, which is a final product manufactured by using a fiber-reinforced composite material, on a display screen. Moreover, the display unit 14 displays a predicted shape model MDL2, which is predicted when this 3-dimensional shape model MDL1 is developed on a flat surface, on the display screen.

Now, the 3-dimensional shape model MDL1 and the predicted shape model MDL2 will be explained. The 3-dimensional shape model MDL1 is a 3-dimensional shape model of a product, which is a final product manufactured by using the fiber-reinforced composite material as mentioned above, and is created by cooperation between the processor 11 and the design support tool in advance.

This 3-dimensional shape model MDL1 is, for example, CMC (Ceramic Matrix Composites) and has a curved surface portion in this embodiment. Moreover, this 3-dimensional shape model MDL1 is woven fabric configured by placing many fiber layers, which are formed by interlacing warp yarns with weft yarns, and has a thick shape as thick as the layers placed on top of each other. Regarding fiber directions of the warp yarns and the weft yarns, ideal fiber directions designated by the user via the input unit 12 are set.

Incidentally, the fiber-reinforced composite material is characterized by anisotropy indicating that the strength depends on the fiber directions as compared to other composite materials. Therefore, the 3-dimensional shape model MDL1 having desired strength is created by setting ideal fiber directions of the warp yarns and the weft yarns in the 3-dimensional shape model MDL1.

On the other hand, the predicted shape model MDL2: is a 3-dimensional shape model formed when the 3-dimensional shape model MDL1 is developed on the flat surface; and is created by cooperation between the processor 11, the design support tool, and a shape prediction unit 151 described later. This predicted shape model MDL2 is a shape model of a fiber material before deformation processing of the product which is the final product. The predicted shape model MDL2 is thick as a result of placing many fiber layers on top of each other and the fiber directions are set to its warp yarns and weft yarns in the same manner as the 3-dimensional shape model MDL1.

According to this embodiment, the predicted shape model MDL2 can be created from the 3-dimensional shape model MDL1. The fiber material before the deformation processing is firstly manufactured in a manufacturing process. When this happens, reference is made to the predicted shape model MDL2 and, therefore, the fiber material can be manufactured with good accuracy. Then, the product with no discrepancy with the 3-dimensional shape model MDL1 can be manufactured by performing the deformation processing of this fiber material.

Referring back to FIG. 1, the memory 15 is a storage medium that stores programs for executing processing for predicting the material shape in cooperation with the processor 11. Specifically speaking, there is a shape prediction unit 151 that predicts the predicted shape model MDL2 from the 3-dimensional shape model MDL1 by deforming the 3-dimensional shape model MDL1. Predicted shape model creation processing (FIG. 3) executed by this shape prediction unit 151 will be explained later.

(2) Outlines of Manufacturing Procedure

Figure 2:
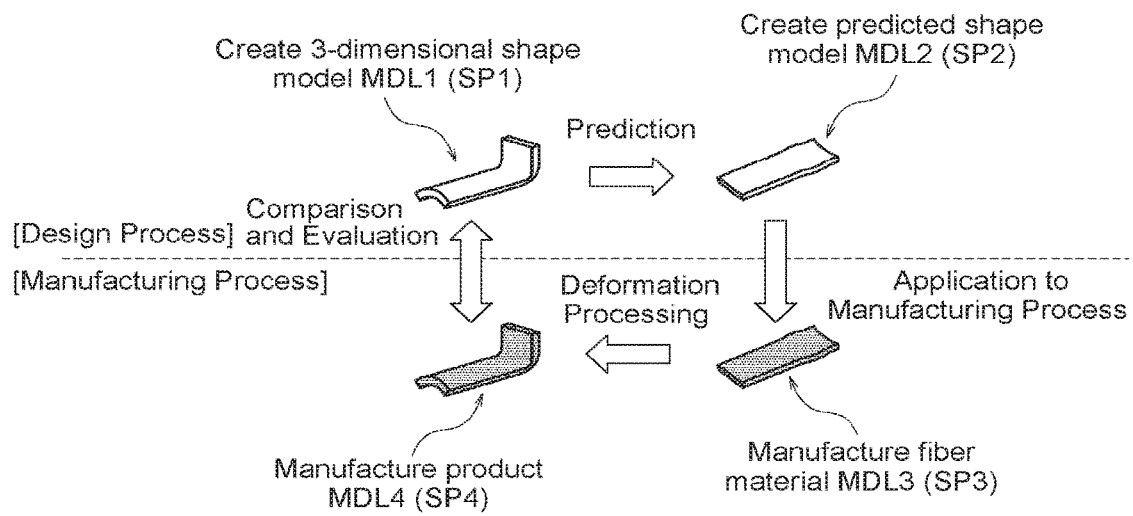
FIG. 2 is an outline diagram of manufacturing procedure.

FIG. 2 illustrates the outlines of manufacturing procedure in this embodiment. The manufacturing procedure mainly includes a design process and a manufacturing process. Firstly, in the design process, the 3-dimensional shape model MDL1 is created (SP1). Then, the predicted shape model MDL2 is formed by predicting the shape formed when the created 3-dimensional shape model MDL1 is deformed to be developed on the flat surface (SP2).

Next, in the manufacturing process, a fiber material MDL3 before the deformation processing is manufactured by referring to the predicted shape model MDL2 (SP3). Then, a product MDL4 is manufactured by actually performing the deformation processing of this fiber material MDL3 (SP4). The manufactured product MDL4 is compared with the 3-dimensional shape model MDL1 and they are evaluated so as to improve the manufacturing procedure to be conducted next time or later.

Incidentally, by conventional general manufacturing procedure, the 3-dimensional shape model MDL1 is created (SP1) and then the fiber material MDL3 is manufactured by predicting the shape of the fiber material from the 3-dimensional shape model MDL1 without creating the predicted shape model MDL2 (SP3). Then, the product MDL4 is manufactured by actually performing the deformation processing of the fiber material MDL3 (SP4).

Specifically speaking, conventionally the fiber material MDL3 is ambiguously predicted and manufactured on the basis of the experts' skills and know-how by referring to the 3-dimensional shape model MDL1, so that discrepancies in the shape or the strength may sometimes occur between the product MDL4, which is the final product, and the 3-dimensional shape model MDL1. In this case, the resulting problem is that many defective products may be produced, thereby causing an increase in manufacturing costs.

In this embodiment, the fiber material MDL3 is manufactured with good accuracy by accurately predicting the shape to be formed by developing the 3-dimensional shape model MDL1 on the flat surface, and creating the predicted shape model MDL2 and the occurrence of discrepancies between the product MDL4, which is the final product, and the 3-dimensional shape model MDL1 is prevented.

(3) Outlines of Predicted Shape Model Creation Processing

Figure 3:
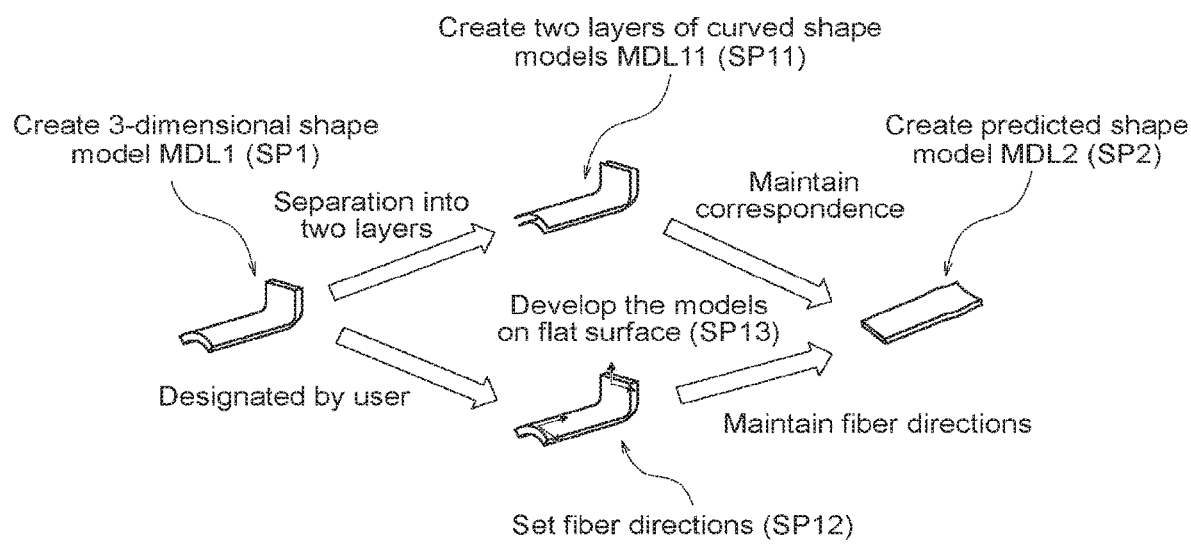
FIG. 3 is an outline diagram of predicted shape model creation processing.

FIG. 3 illustrates the outlines of predicted shape model creation processing. The predicted shape model creation processing is processing executed for: predicting the shape to be formed when the 3-dimensional shape model MDL1 is deformed to be developed on the flat surface; and creating the predicted shape model MDL2 as mentioned above. Incidentally, it is assumed as a premise that the predicted shape model MDL2 is of a plate shape which has a constant thickness.

Firstly, the 3-dimensional shape model MDL1 is created (SP1). Then, a thickness portion of the created 3-dimensional shape model MDL1 is removed and the 3-dimensional shape model MDL1 is separated into two layers, that is, its upper surface and its lower surface, thereby creating curved shape models MDL11 (SP11). Meanwhile, regarding fiber directions of warp yarns and weft yarns of the curved shape models MDL11, the fiber directions which the user considers to be ideal are set (SP12).

Then, when deforming and developing the 3-dimensional shape model MDL1 on the flat surface, the 3-dimensional shape model MDL1 is developed on the flat surface while maintaining the correspondence relationship between the two layers of the curved shape models MDL11 created in step SP11 and maintaining the fiber directions set in step SP12 (SP13), and the predicted shape model MDL2 is created (SP2).

(4) Flowchart

Figure 4:
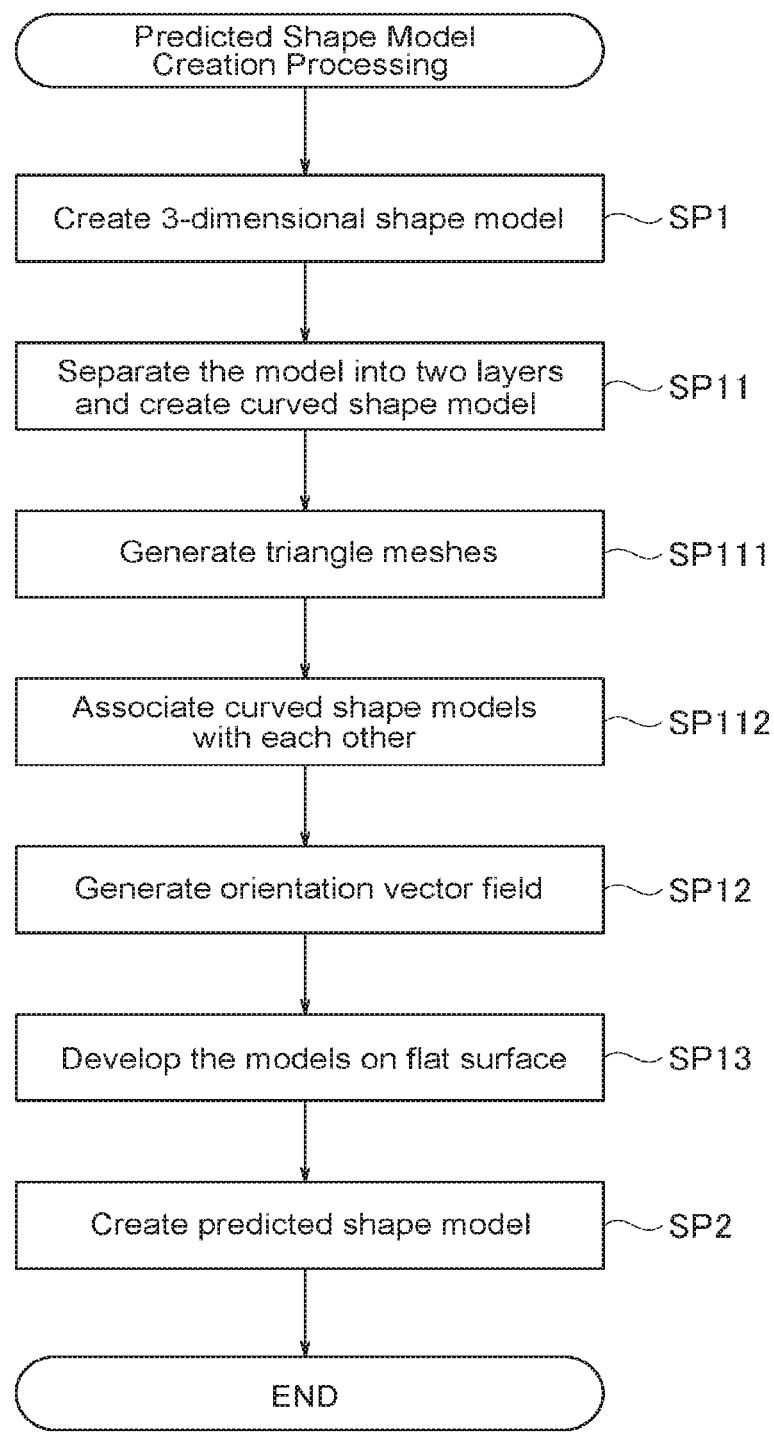
FIG. 4 is a flowchart of the predicted shape model creation processing.

FIG. 4 illustrates a detailed processing sequence for the predicted shape model creation processing. This predicted shape model creation processing is executed by cooperation between the processor 11, the design support tool, and the shape prediction unit 151 as triggered by the reception of an execution instruction, which has been issued by the user, by the input unit 12. For ease of explanation below, the explanation will be given by referring to the processor 11 as a processing subject.

The processor 11 firstly creates the 3-dimensional shape model MDL1 (SP1). Next, the processor 11 separates the created 3-dimensional shape model MDL1 into two layers, that is, its upper surface and its lower surface and creates the curved shape models MDL11 (SP11). Then, the processor 11 generates meshes on the surfaces of these two layers of the curved shape models MDL11 by using a plurality of triangles (SP111).

Figure 5:
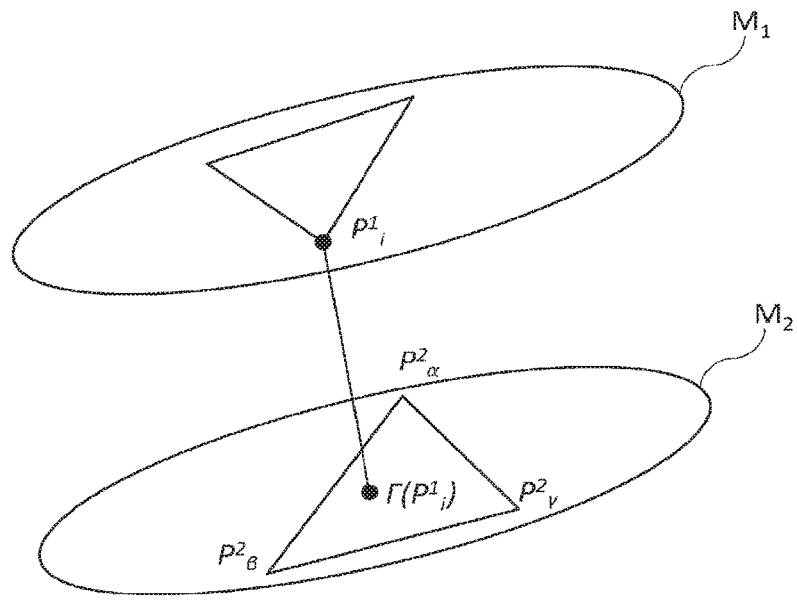
FIG. 5 is a conceptual diagram of processing for associating two layers with each other.

The processor 11 associates the two layers of the curved shape models MDL11 by using vertexes and edges of the triangles formed on the surfaces by means of the mesh generation (SP112). The details of this processing for associating the two layers with each other will be explained later (FIG. 5).

Figure 6:
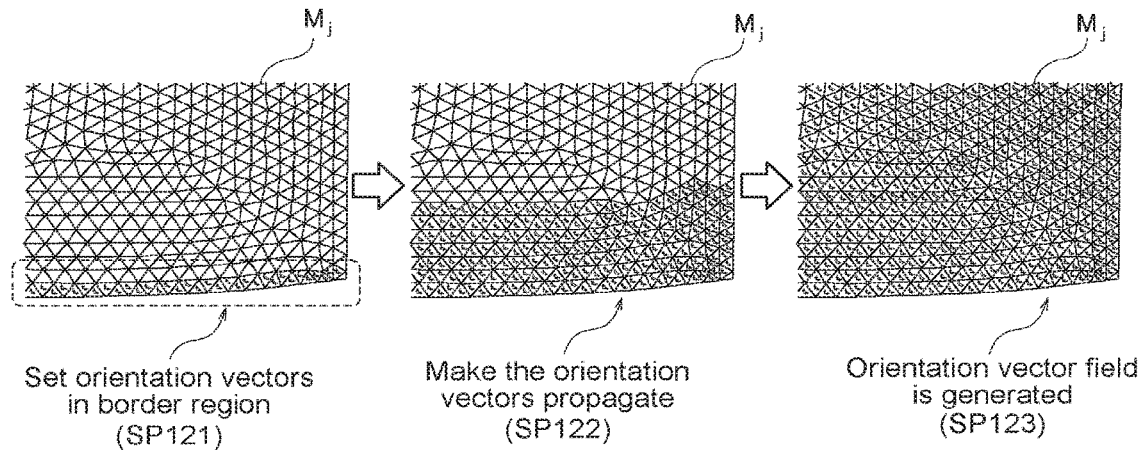
FIG. 6 is a conceptual diagram of orientation vector field generation processing.

Next, the processor 11 sets orientation vectors, which are indicative of the fiber directions of the warp yarns and the weft yarns, to all the triangles formed on the surfaces by means of the mesh generation, thereby generating an orientation vector field (SP12). The details of this orientation vector field generation processing will be explained later (FIG. 6).

Figure 7:
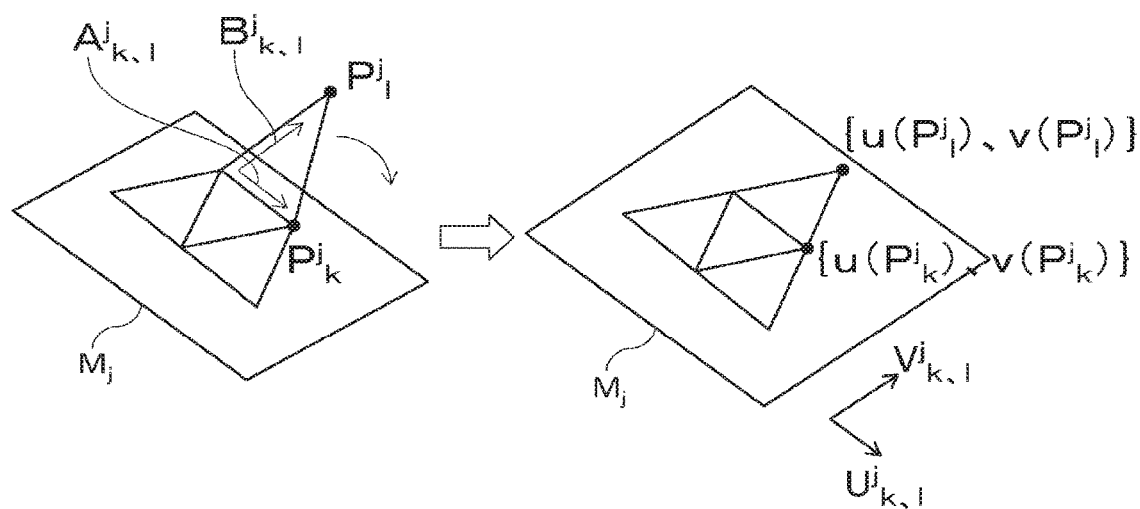
FIG. 7 is a conceptual diagram of flat surface development processing.

Subsequently, the processor 11 develops the two layers of the curved shape models MDL11 on the flat surface on the basis of the correspondence relationship between the two layers of the curved shape models MDL11 associated with each other in step SP112 and the orientation vector field generated in step SP12 (SP13). The details of this flat surface development processing will be explained later (FIG. 7).

Then, the processor 11 creates the predicted shape model MDL2 on the basis of the two layers of the curved shape models MDL11, which have been developed on the flat surface (SP2), and then terminates this processing.

(5) Details of Each Processing

The details of each processing in the predicted shape model creation processing will be explained below. Specifically speaking, the details of each processing of the processing for associating the two layers with each other (FIG. 4: SP112), the orientation vector field generation processing (FIG. 4: SP12), and the flat surface development processing (FIG. 4: SP13) will be explained. Before explaining the details of each processing, signs used in each processing will be defined.

In step SP111 of the predicted shape model creation processing, the meshes are generated on the surfaces of the two layers of the curved shape models MDL11 by using a plurality of triangles, where the meshes of the respective two layers which are then formed are defined as $M_1$, $M_2$. Moreover, the vertex(es) of the triangles included in the meshes $M_j$ (j=1, 2) is defined as $P^j_i$; (i=1, 2, 3, and so on up to the number of vertexes); and the edges of the triangles are defined as $(P^j_k, P^j_l)$.

Furthermore, in step SP12, the orientation vectors are set to all the triangles formed on the surfaces of the curved shape models MDL11 by means of the mesh generation, where the orientation vectors which are set to the edges $(P^j_k, P^j_l)$ of the triangles are defined as $A^j_{k,l}$, $B^j_{k,l}$.

Furthermore, in step SP13, the two layers of the curved shape models MDL11 are developed on the flat surface, where a map formed by mapping from the 3-dimensional coordinate system xyz onto the plane coordinate system uv is defined as $\{u(P^j_i), v(P^j_i)\}$. This map makes it possible to convert a coordinate system of the triangle vertexes $P^j_i$ from the 3-dimensional coordinate system xyz to the plane coordinate system uv and obtain coordinate values of the triangle vertexes on the flat surface. These coordinate values represent a development diagram and the curved shape models MDL11 can be developed on the flat surface on the basis of the development diagram.

FIG. 5 illustrates the details of the processing for associating two layers with each other (FIG. 4: SP112). The vertex $P^1_i$ of a triangle in the mesh $M_1$ is associated with a point in the mesh $M_2$ at the closest linear distance from the above-mentioned vertex as a corresponding point $\Gamma_2(P^1_i)$ of the vertex $P^1_i$. When this corresponding point $\Gamma_2(P^1_i)$ is located within a triangle $(P^2_\alpha, P^2_\beta, P^2_\gamma)$ in the mesh $M_2$, the corresponding point $\Gamma_2(P^1_i)$ can be expressed as $\Gamma_2(P^1_i) = \pi_\alpha P^2_\alpha + \pi_\beta P^2_\beta + \pi_\gamma P^2_\gamma$ by using barycentric coordinates.

Furthermore, when the vertex $P^1_i$ in the mesh $M_1$ is located in the border of the mesh $M_1$, the corresponding point $\Gamma_2(P^1_i)$ can be selected from the edges $(P^2_\alpha, P^2_\beta)$ in the border of the mesh $M_2$ and can be expressed as $\Gamma_2(P^1_i) = \pi_\alpha P^2_\alpha + \pi_\beta P^2_\beta$ by using an internal ratio. When the curved shape models MDL11 are developed on the flat surfaces, constraint conditions indicated in Expressions 1 and 2 below are imposed in order to maintain the correspondence relationship between the two layers as much as possible.

[Math. 1]

Constraint Condition 1: when point $P_i^1$ is general $$u(P_i^1) = u\{\Gamma_2(P_i^1)\} = \pi_\alpha u(P_\alpha^2) + \pi_\beta u(P_\beta^2) + \pi_\gamma u(P_\gamma^2),$$
$$v(P_i^1) = v\{\Gamma_2(P_i^1)\} = \pi_\alpha v(P_\alpha^2) + \pi_\beta v(P_\beta^2) + \pi_\gamma v(P_\gamma^2), \tag{1}$$

Constraint Condition 1: when point $P_i^1$ is general

[Math. 2]

Constraint Condition 2: when point $P_i^1$ is in the border $$u(P_i^1) = u\{\Gamma_2(P_i^1)\} = \pi_\alpha u(P_\alpha^2) + \pi_\beta u(P_\beta^2),$$
$$v(P_i^1) = v\{\Gamma_2(P_i^1)\} = \pi_\alpha v(P_\alpha^2) + \pi_\beta v(P_\beta^2), \tag{2}$$

Constraint Condition 2: when point $P_i^1$ is in the border

FIG. 6 illustrates the details of the orientation vector field generation processing (FIG. 4: SP12). When the user designates orientation vectors for triangles in the border region of the mesh $M_j$ via the input unit 12, the processor 11 sets orientation vectors $A^j_{k,l}$, $B^j_{k,l}$ to the triangles in the border region (SP121).

Next, the processor 11 equalizes each of the set orientation vectors $A^j_{k,l}$, $B^j_{k,l}$ and makes the equalized orientation vectors propagate to all other triangles by simulating the state of heat transfer (SP122). As a result, an orientation vector field is generated (SP123).

FIG. 7 is a conceptual diagram of the flat surface development processing (FIG. 4: SP13). When developing the curved shape models MDL11 on the flat surface, the curved shape models MDL11 are developed so that a gradient direction of the orientation vectors $A^j_{k,l}$, $B^j_{k,l}$ which are set to edges $(P^j_k, P^j_l)$ of the triangles in the mesh $M_j$ matches a gradient direction of orientation vectors $U^j_{k,l}$, $V^j_{k,l}$ which are set to edges $\{u(P^j_{k,l}), v(P^j_{k,l})\}$ when the edges $(P^j_k, P^j_l)$ are mapped to the plane coordinate system uv.

Expression 3 mentioned below is used so that the gradient direction of the orientation vectors $A^j_{k,l}$, $B^j_{k,l}$ matches the gradient direction of the orientation vectors $U^j_{k,l}$, $V^j_{k,l}$ in the plane coordinate system uv. Moreover, a minimization function $F_1$ based on Expression 3 below is set as Expression 4 mentioned below.

[Math. 3]

$$u(P_k^j) - u(P_l^j) = A_{k,l}^j \cdot (P_k^j - P_l^j),$$
$$v(P_k^j) - v(P_l^j) = B_{k,l}^j \cdot (P_k^j - P_l^j), \tag{3}$$

[Math. 4]

$$F_{1,u} = \Sigma_{j=1,2} \Sigma_{(P_k^j, P_l^j) \in M_j} \{u(P_k^j) - u(P_l^j) - A_{k,l}^j \cdot (P_k^j - P_l^j)\}^2$$
$$F_{1,v} = \Sigma_{j=1,2} \Sigma_{(P_k^j, P_l^j) \in M_j} \{v(P_k^j) - v(P_l^j) - B_{k,l}^j \cdot (P_k^j - P_l^j)\}^2 \tag{4}$$

Furthermore, a minimization function $F_2$ based on Expression 1 mentioned earlier is set as Expression 5 mentioned below and a minimization function $F_3$ based on Expression 2 mentioned earlier is set as Expression 6 mentioned below. Incidentally, since the minimization function $F_3$ in Expression 6 below is a minimization function based on the constraint condition for points in the border, Expression 2 mentioned earlier is multiplied by the Lagrange multipliers method and the minimization function based on the strong-form constraint condition is thereby obtained in order to guarantee that the borders of the meshes $M_1$, $M_2$ correspond with each other. A minimization function F which integrates Expression 4 to Expression 6 is indicated as Expression 7 below.

[Math. 5]

$$F_2 = \Sigma_{P_i^j \in M_1/\partial M_1} \{u(P_i^1) - u\{\Gamma_2(P_i^1)\}\}^2 \quad (5)$$

[Math. 6]

$$F_3 = \Sigma_{P_i^j \in \partial M_1} \lambda_m \{u(P_i^1) - u\{\Gamma_2(P_i^1)\}\}^2 \quad (6)$$

[Math. 7]

$$F = F_{1,u} + F_{1,v} + F_2 + F_3 \quad (7)$$

The curved shape models MDL11 can be developed on the flat surface to minimize the sum of strains by minimizing Expression 7 mentioned above by using the conjugate gradient method. Incidentally, since a plane coordinate value to be found is a relative value, a solution is calculated by fixing a coordinate value of an arbitrary one point.

(6) Verification Results

Figure 8:
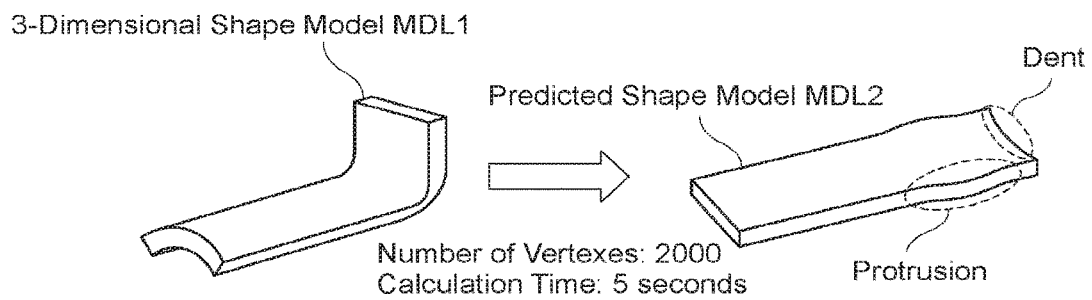
FIG. 8 is a development result diagram.

FIG. 8 illustrates development results obtained when the 3-dimensional shape model MDL1 is developed on the flat surface. As explained above, the 3-dimensional shape model MDL1 is separated into two layers, while the fiber directions are set; and as the correspondence relationship between the two layers and the fiber directions are maintained, the two layers are developed on the flat surface, thereby creating the predicted shape model MDL2.

Under this circumstance, the number of vertexes was 2000 and calculation time was 5 seconds. According to this result, the user can use the processing for creating the predicted shape model MDL2 without stress at actual designing sites.

Incidentally, regarding the details of the predicted shape model MDL2, it is not a complete rectangular parallelepiped, but it has protrusions and dents at some parts. The product MDL4 which is the final product can be manufactured with good accuracy by manufacturing the fiber material MDL3 with reference to the predicted shape model MDL2 with such protrusions and dents.

Figure 9:
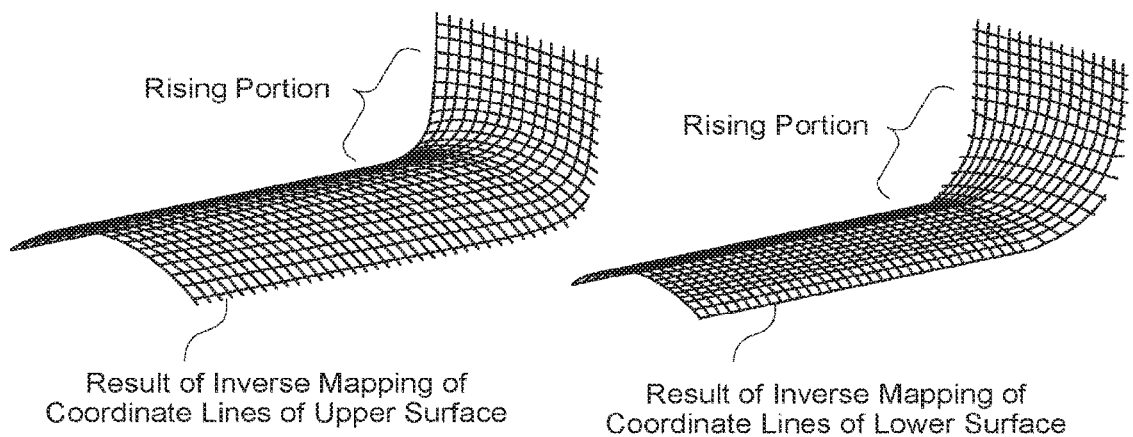
FIG. 9 is inverse mapping diagrams.

FIG. 9 illustrates the results of inverse mapping of coordinate lines of the upper surface and the lower surface in the plane coordinate system uv onto the 3-dimensional coordinate system xyz. A quadrangle formed by the coordinate lines which intersect with each other becomes closer to a square, this indicates less expansion and distortion. Flattened quadrangles are formed at a rising portion; and since this rising portion is actually the portion with much expansion and distortion, it is shown that the inverse mapping is calculated accurately.

Figure 10:
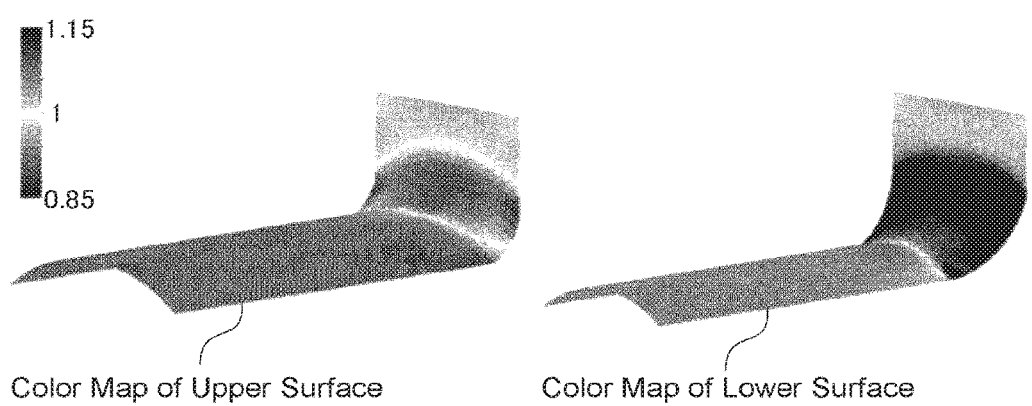
FIG. 10 illustrates expansion evaluation results via color maps.

FIG. 10 illustrates expansion evaluation results via color maps. When $A_{xyz}$ represents the sum of the areas of a set of triangles which include, as their vertex, a vertex of one triangle of focus in the 3-dimensional coordinate system xyz and, on the other hand, $A_{uv}$ represents the sum of the area of corresponding triangles in the plane coordinate system uv, the square root of their area ratio is calculated, thereby obtaining an expansion evaluation value A. The expansion evaluation value A is indicated in Expression 8 below.

[Math. 8]

$$\text{Expansion Evaluation Value } A = \sqrt{\frac{A_{uv}}{A_{xyz}}} \quad (8)$$

Expansion Evaluation Value A

When the expansion evaluation value A is 1, it means no expansion or contraction; and when the expansion evaluation value A is less than 1, it means contraction. Furthermore, when the expansion evaluation value A is more than 1, it means expansion. Since the evaluation value A of the rising portion of the upper surface is less than 1 and the rising portion of the actual product MDL4 is shrunk, it shows that the evaluation is accurate. Furthermore, since the evaluation value A of the rising portion of the lower surface is more than 1 and the rising portion of the actual product MDL4 is expanded, it shows that the evaluation is accurate.

Figure 11:
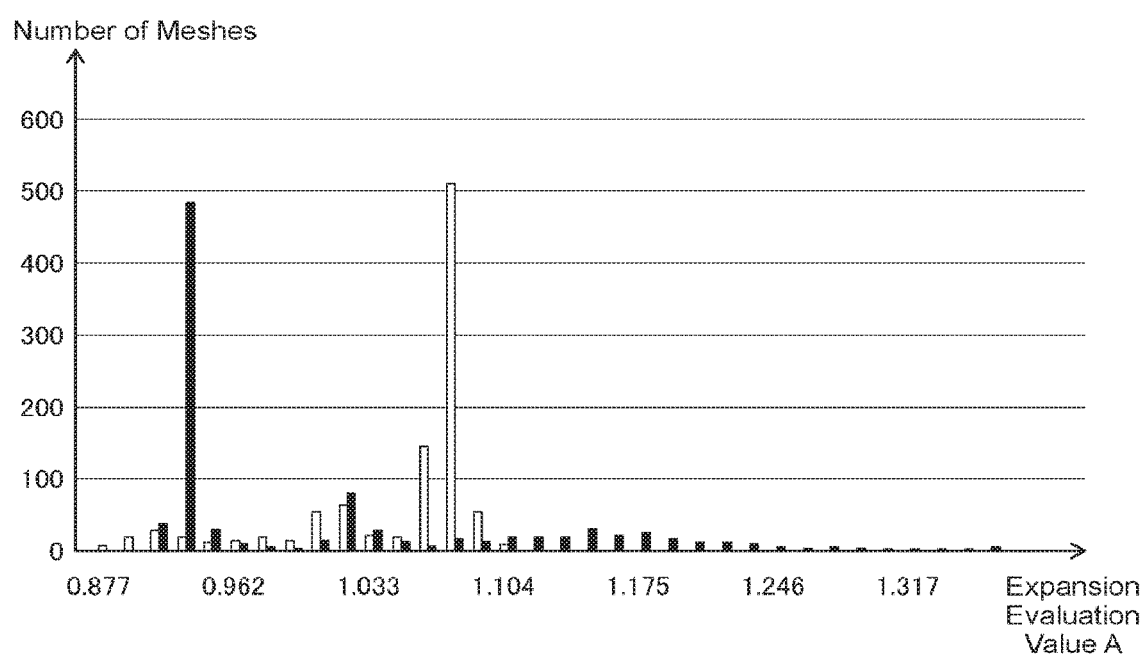
FIG. 11 illustrates the expansion evaluation results via a histogram.

FIG. 11 shows the expansion evaluation results via a histogram. It shows that there are peaks at a portion where the expansion evaluation value A is less than 1, and at a portion where the expansion evaluation value A is more than 1, respectively. Referring to the expansion evaluation results via the color maps of FIG. 10, there is a portion of the upper surface where the evaluation value A is less than 1, and there is a portion of the lower surface where the evaluation value A is more than 1, so that consistency with the color maps can be confirmed. Quantitative evaluations were successively obtained with respect to surface-direction expansion and contraction by referring to the expansion evaluation results in FIG. 10 and FIG. 11.

(7) Effects of this Embodiment

When the design support apparatus 1 according to this embodiment is employed as described above, the 3-dimensional shape model MDL1 is separated into two layers, that is, its upper surface and its lower surface and the 3-dimensional shape model MDL1 is developed on the flat surface on the basis of the correspondence relationship between the separated curved shape models MDL11 and the orientation vectors field, so that it is possible to reduce the calculation time and create the predicted shape model MDL2 at high speed as compared to the case where the 3-dimensional shape model MDL1 is directly developed on the flat surface.

In the actual manufacturing process, the fiber material MDL3 is manufactured by referring to the predicted shape model MDL2 and the product MDL4 is manufactured by performing the deformation processing of the fiber material MDL3; and it is thereby possible to prevent the occurrence of discrepancies in the shape and the strength between the product MDL4 and the 3-dimensional shape model MDL1. Since the product MDL4 similar to the ideal 3-dimensional shape model MDL1 can be manufactured, it is possible to curb the manufacturing cost.

(8) Other Embodiments

In the embodiment which has been explained above, the 3-dimensional shape model MDL1 is separated into two layers to create the curved shape models MDL11, however, the disclosure is not limited to this example and, for example, the 3-dimensional shape model MDL1 may be separated into a plurality of layers such as three layers or more. In this case, the predicted shape model MDL2 can be created by developing the 3-dimensional shape model MDL1 on the flat surface by avoiding disrupting the correspondence relationship between the curved shape models MDL11 which are the plurality of layers. Since the predicted shape model MDL2 can be created in consideration of internal deformations of the 3-dimensional shape model MDL1, the accuracy of the predicted shape model MDL2 can be enhanced.

Furthermore, deformations of the internal state which occur when the deformation processing of the fiber material MDL3 is performed may be recorded in a database in advance; and when the curved shape models MDL11 which are the two separated layers are developed on the flat surface, supervised search may be applied to this database. In this case too, the predicted shape model MDL2 can be created in consideration of the internal deformations of the 3-dimensional shape model MDL1.

REFERENCE SIGNS LIST 1 design support apparatus
11 processor
12 input unit
13 CAD data storage unit
14 display unit
15 memory
151 shape prediction unit

The invention claimed is:

1. A computer for predicting a plane shape model of a fiber material before being processed into a product by changing a shape of the fiber material, the computer comprising:
 a memory, wherein the memory includes a program for the prediction;
 a processor; and
 an input device,
 wherein steps executed by the processor based on the program include:
 creating a 3-dimensional shape model of the product, wherein the 3-dimensional shape model is configured as a layered object, in which a plurality of fiber layers formed by interlacing warp yarns with weft yarns are placed on top of each other, and wherein the 3-dimensional shape model has a thickness corresponding to the plurality of fiber layers;
 creating a curved shape model based on the 3-dimensional shape model, wherein the curved shaped model is configured of an upper layer and a lower layer of the plurality of fiber layers;
 setting a positional relationship between the upper layer and the lower layer, wherein the setting includes dividing each of the upper layer and the lower layer into a plurality of polygons and causing 3-dimensional coordinates of the plurality of polygons of the upper layer to correspond to 3-dimensional coordinates of the plurality of polygons of the lower layer;
 accepting directions of the warp yarns and the weft yarns of the fiber materials, the directions being input via the input device;
 setting an orientation vector to each of polygons positioned at a border of the upper layer and each of polygons positioned at a border of the lower layer based on the directions of the warp yarns and the direction of the weft yarns;
 setting a vector field to each of the upper layer and the lower layer by causing the orientation vector of the upper layer to be transmitted to all the polygons of the upper layer and causing the orientation vector of the lower layer to be transmitted to all the polygons of the lower layer by simulating a state of heat transfer; and
 setting the plane shape model by expanding each of the upper layer and the lower layer in plane coordinates so as to maintain each vector field of the upper layer and the lower layer and the positional relationship between the upper field and the lower field and combining the upper layer and the lower layer which are expanded in the plane coordinates.

2. A method for predicting a plane shape model of a fiber material before being processed into a product by changing a shape of the fiber material, the method comprising:
 creating a 3-dimensional shape model of the product, wherein the 3-dimensional shape model is configured as a layered object, in which a plurality of fiber layers formed by interlacing warp yarns with weft yarns are placed on top of each other, and wherein the 3-dimensional shape model has a thickness corresponding to the plurality of fiber layers;
 creating a curved shape model based on the 3-dimensional shape model, wherein the curved shaped model is configured of an upper layer and a lower layer of the plurality of fiber layers;
 setting a positional relationship between the upper layer and the lower layer, wherein the setting includes dividing each of the upper layer and the lower layer into a plurality of polygons and causing 3-dimensional coordinates of the plurality of polygons of the upper layer to correspond to 3-dimensional coordinates of the plurality of polygons of the lower layer;
 accepting directions of the warp yarns and the weft yarns of the fiber materials, the directions being input via an input device;
 setting an orientation vector to each of polygons positioned at a border of the upper layer and each of polygons positioned at a border of the lower layer based on the directions of the warp yarns and the direction of the weft yarns;
 setting a vector field to each of the upper layer and the lower layer by causing the orientation vector of the upper layer to be transmitted to all the polygons of the upper layer and causing the orientation vector of the lower layer to be transmitted to all the polygons of the lower layer by simulating a state of heat transfer; and
 setting the plane shape model by expanding each of the upper layer and the lower layer in plane coordinates so as to maintain each vector field of the upper layer and the lower layer and the positional relationship between the upper field and the lower field and combining the upper layer and the lower layer which are expanded in the plane coordinates.

3. A non-transitory computer readable data medium storing an executable program, wherein the program, when executed, causes a computer to execute a method for predicting a plane shape model of a fiber material before being processed into a product by changing a shape of the fiber material comprising:
 creating a 3-dimensional shape model of the product, wherein the 3-dimensional shape model is configured as a layered object, in which a plurality of fiber layers formed by interlacing warp yarns with weft yarns are placed on top of each other, and wherein the 3-dimensional shape model has a thickness corresponding to the plurality of fiber layers;
 creating a curved shape model based on the 3-dimensional shape model, wherein the curved shaped model is configured of an upper layer and a lower layer of the plurality of fiber layers;
 setting a positional relationship between the upper layer and the lower layer, wherein the setting includes dividing each of the upper layer and the lower layer into a plurality of polygons and causing 3-dimensional coordinates of the plurality of polygons of the upper layer to correspond to 3-dimensional coordinates of the plurality of polygons of the lower layer;

accepting directions of the warp yarns and the weft yarns of the fiber materials, the directions being input via an input device;

setting an orientation vector to each of polygons positioned at a border of the upper layer and each of polygons positioned at a border of the lower layer based on the directions of the warp yarns and the direction of the weft yarns;

setting a vector field to each of the upper layer and the lower layer by causing the orientation vector of the upper layer to be transmitted to all the polygons of the upper layer and causing the orientation vector of the lower layer to be transmitted to all the polygons of the lower layer by simulating a state of heat transfer; and setting the plane shape model by expanding each of the upper layer and the lower layer in plane coordinates so as to maintain each vector field of the upper layer and the lower layer and the positional relationship between the upper field and the lower field and combining the upper layer and the lower layer which are expanded in the plane coordinates.

4. The computer according to claim 1, wherein the polygons are triangles.

5. The method according to claim 2, wherein the polygons are triangles.

6. The non-transitory computer readable data medium according to claim 3, wherein the polygons are triangles.

\* \* \* \* \*